United States Patent [19]

Okabe

[11] 3,958,254

[45] May 18, 1976

[54] ELECTRONIC PRINTER

[75] Inventor: Katsuhiko Okabe, Tokorozawa, Japan

[73] Assignee: Copal Company Limited, Tokyo, Japan

[22] Filed: Nov. 8, 1974

[21] Appl. No.: 522,293

[30] Foreign Application Priority Data

Nov. 8, 1973 Japan .............................. 48-129204

[52] U.S. Cl. ......................... 346/139 C; 346/139 R; 346/141; 197/36

[51] Int. Cl.[2] .................... G01D 15/02; G01D 15/20

[58] Field of Search ......... 346/139 R, 139 A, 139 B, 346/139 C, 141; 197/36

[56] References Cited

UNITED STATES PATENTS

| | | | |
|---|---|---|---|
| 1,357,573 | 11/1920 | Lee | 197/36 |
| 2,629,478 | 2/1953 | Simon | 197/36 X |
| 3,651,913 | 3/1972 | Albrile | 197/36 |

*Primary Examiner*—L. T. Hix
*Assistant Examiner*—Stanley J. Witkowski
*Attorney, Agent, or Firm*—Cushman, Darby & Cushman

[57] ABSTRACT

An electronic printer comprising a printing head having two straight grooves perpendicular to each other, a pin provided on a carriage and engageable with one of the two grooves, and a plate spring secured to the carriage and engageable with the other of the two grooves to hold the printing head on the carriage, in order to facilitate the attachment of the printing head on the carriage. The plate spring can also hold a flat cable connected to the printing head.

3 Claims, 6 Drawing Figures

ELECTRONIC PRINTER

BACKGROUND OF THE INVENTION a. Field of the Invention

The present invention relates to an electronic printer for printing with reciprocating motion of a printing head and, more particularly, to a device for supporting the printing head on a carriage in said type of printer.

b. Description of the Prior Art.

In conventional printers of this type, a printing head is fixed on a carriage by screws. This makes difficult not only to remove the printing head from the carriage, but to mount properly the printing head on the carriage.

SUMMARY OF THE INVENTION

It is, therefore, a primary object of the present invention to provide a device for supporting the printing head on the carriage arranged so that attachment and detachment of the printing head can be performed by the simple operation.

Another object of the present invention is to provide a device for supporting the printing head on the carriage arranged so that the printing head is held properly in a predetermined position on the carriage whenever it is attached on the carriage.

Still another object of the present invention is to provide an electronic printer arranged so that a flat cable connected to the printing head is maintained on the carriage so as not to disturb the movement of the carriage.

DESCRIPTION OF THE PREFERRED EMBODIMENTS

Figure 1:
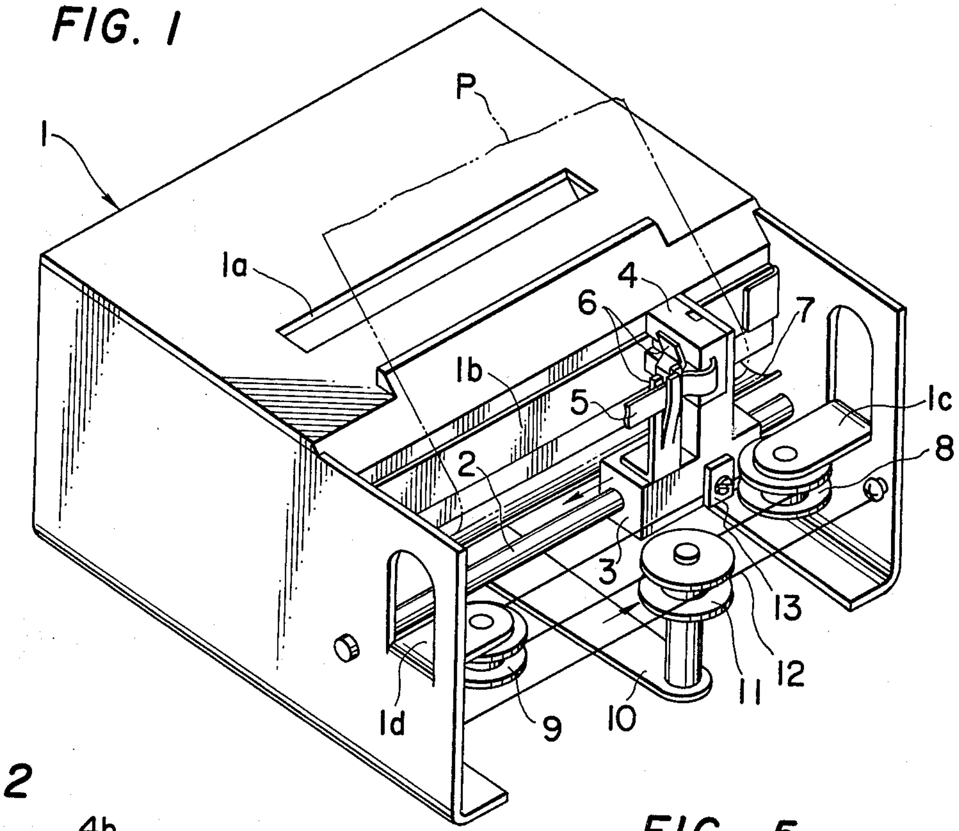
FIG. 1 shows a perspective view of the electronic printer provided with one embodiment of the device for supporting the printing head according to the present invention.

Referring to FIG. 1, reference numeral 1 represents a body frame having an elongate port 1*a* for feeding therein a paper P to be printed, a vertical surface 1*b* and arms 1*c*, 1*d*. Numeral 2 represents a guide rod attached to the body frame 1 in parallel with the vertical surface 1*b*. Numeral 3 represents a carriage movably mounted on the guide rod 2. Numeral 4 represents a printing head as thermal printing head supported on the carriage in the manner as will be described hereinafter. Numeral 5 represents a flat cable connected to the printing head 4 to apply various electric signals on the printing head 4. Numeral 6 represents a plate spring fixed to the carriage 3 to keep the pringing head 4 and flat cable 5 in the predetermined positions on the carriage in the manner as will be described hereinafter. Numeral 7 represents a guide plate attached to the body frame 1 to guide the paper P between the vertical surface 1*b* and printing head 4 through the inner space of the body frame from the elongate port 1*a*. Numerals 8 and 9 represent pulleys rotatably supported on the arms 1*c* and 1*d*, respectively. Numeral 10 represents an actuating arm mounted on the under-surface of body frame 1 and rotatably supporting a pulley 11 thereon. The actuating arm is moved by a drive means not shown provided in the body frame 1 so as to move the pulley 11 in parallel with the guide rod 2. Numeral 12 represents a wire belt connected to the carriage 3 by a connecting piece 13 and having one side portion thereof applied in S-shape between pulleys 9 and 11 and having the other side portion applied in the reverse S-shaped between pulleys 8 and 11. Both ends of the wire belt 12 are respectively connected to opposite side walls of the body frame 1.

It will be apparent from the above description that the carriage 3 of printing head 4 may be moved in the arrow direction of FIG. 1 on the guide rod 2 through the wire belt 12 when the actuating arm 10 or pulley 11 is moved in the arrow direction of FIG. 1 by the drive means not shown. Printing is performed by the printing head 4 on the paper P between the vertical surface 16 and printing head 4 when the electric signal is applied to the printing head 4 through the flat cable 5, during the movement of the printing head 4 from the position shown in FIG. 1 to the opposite end position. Thus, when the carriage 3 is stopped in the opposite end position, the printing is finished, and then the carriage 3 is returned back to the position shown in FIG. 1. During this movement of the carriage 3, printing is not performed, but the paper P is fed by one pitch to prepare for next printing.

Figure 2:
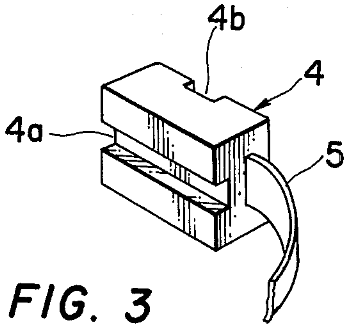
FIG. 2 is a perspective view of one embodiment of the printing head according to the present invention.
Figure 4:
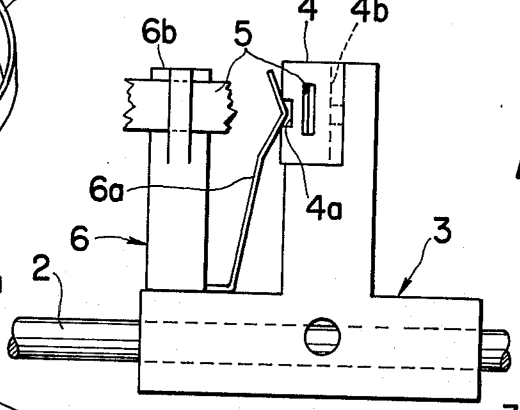
FIG. 4 is a side elevational view of the carriage on which the printing head in FIG. 2 is attached.
Figure 3:
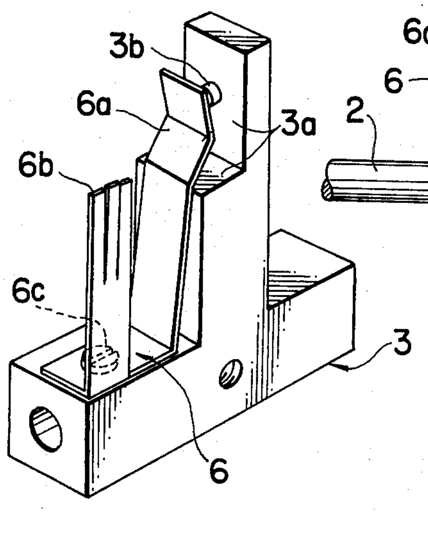
FIG. 3 is a perspective view of the carriage suitable for supporting the printing head in FIG. 2.

As shown in FIGS. 2 to 4, the printing head 4 has a lateral straight groove 4*a* formed on one side face thereof and a longitudinal straight groove 4*b* formed perpendicular to the lateral groove 4*a* on the other side face opposite to the aforesaid one side face. On the carriage 3 is formed a shoulder portion 3*a* on which vertical surface has a protrusion or pin 3*b* engageable with the longitudinal groove 4*b* of the printing head 4. The plate spring 6 fixed on the carriage 3 by a screw 6*c* has high resiliency and has two arms 6*a* and 6*b*. The arm 6*a* has a bent portion engageable with the lateral groove 4*a* of the printing head 4. The arm 6*b* is divided into three pieces at its top portion.

As apparent from FIG. 4, when the printing head 4 is supported on the shoulder portion 3*a* of the carriage 3 by engaging the pin 3*b* with the longitudinal groove 4*b* and also engaging the bent portion of arm 6*a* with the lateral groove 4*a*, the printing head 4 is properly held in the predetermined position by the pushing force of the arm 6*a*. The printing head 4 may be easily removed from the carriage 3 by releasing the arm 6*a* from the lateral groove 4*a* and then by pinching up the printing head 4. When the printing head 4 is held on the carriage 3 in the manner described above, the flat cable 5 is held between the divided pieces of the arm 6*b* as shown in FIG. 4, so as not to disturb the reciprocating motion of the carriage 3.

Figure 5:
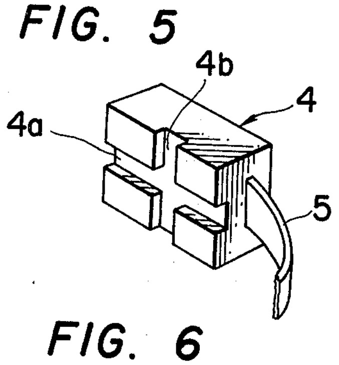
FIG. 5 is a perspective view of another embodiment of the printing head according to the present invention.
Figure 6:
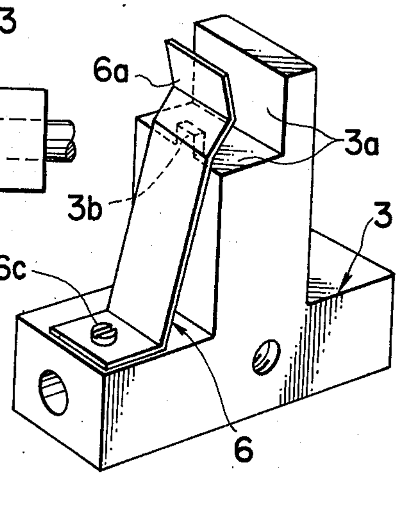
FIG. 6 is a perspective view of the carriage suitable for supporting the printing head in FIG. 5.

The printing head 4 shown in FIG. 5 is different from the printing head 4 of FIG. 2 in that the lateral groove 4*a* and longitudinal groove 4*b* are formed on one side face of the printing head, and the carriage 3 shown in FIG. 6 is different from the carriage 3 of FIG. 3 in that the protrusion 3*b* is engageable with the longitudinal groove 4*b* is formed on the horizontal surface of the shoulder portion 3*a*. According to this embodiment, the printing head 4 may be more easily attached on the carriage 3.

I claim:

1. An electronic printer comprising a carriage, a printing head detachably mounted on said carriage and having two grooves extending perpendicular to each other thereon, a protrusion formed on said carriage and engaged with one of said two grooves, and a plate spring fixed on said carriage and engaged with the other of said two grooves.

2. An electronic printer according to claim 1, in which one of said two grooves is formed on one side face of said printing head, and the other of said two grooves is formed on the other side face opposite to said one side face.

3. An electronic aprinter comprising a printing head having two grooves perpendicular to each other thereon, said grooves being formed on one side face of said printing head, a carriage supporting said printing head and having a protrusion engageable with one of said two grooves, and a plate spring fixed on said carriage and engageable with the other of said two grooves.

* * * * *